T. W. SCOTT.
AIR BRAKE CONTROLLING MECHANISM.
APPLICATION FILED NOV. 23, 1916.
1,240,796.
Patented Sept. 18, 1917.
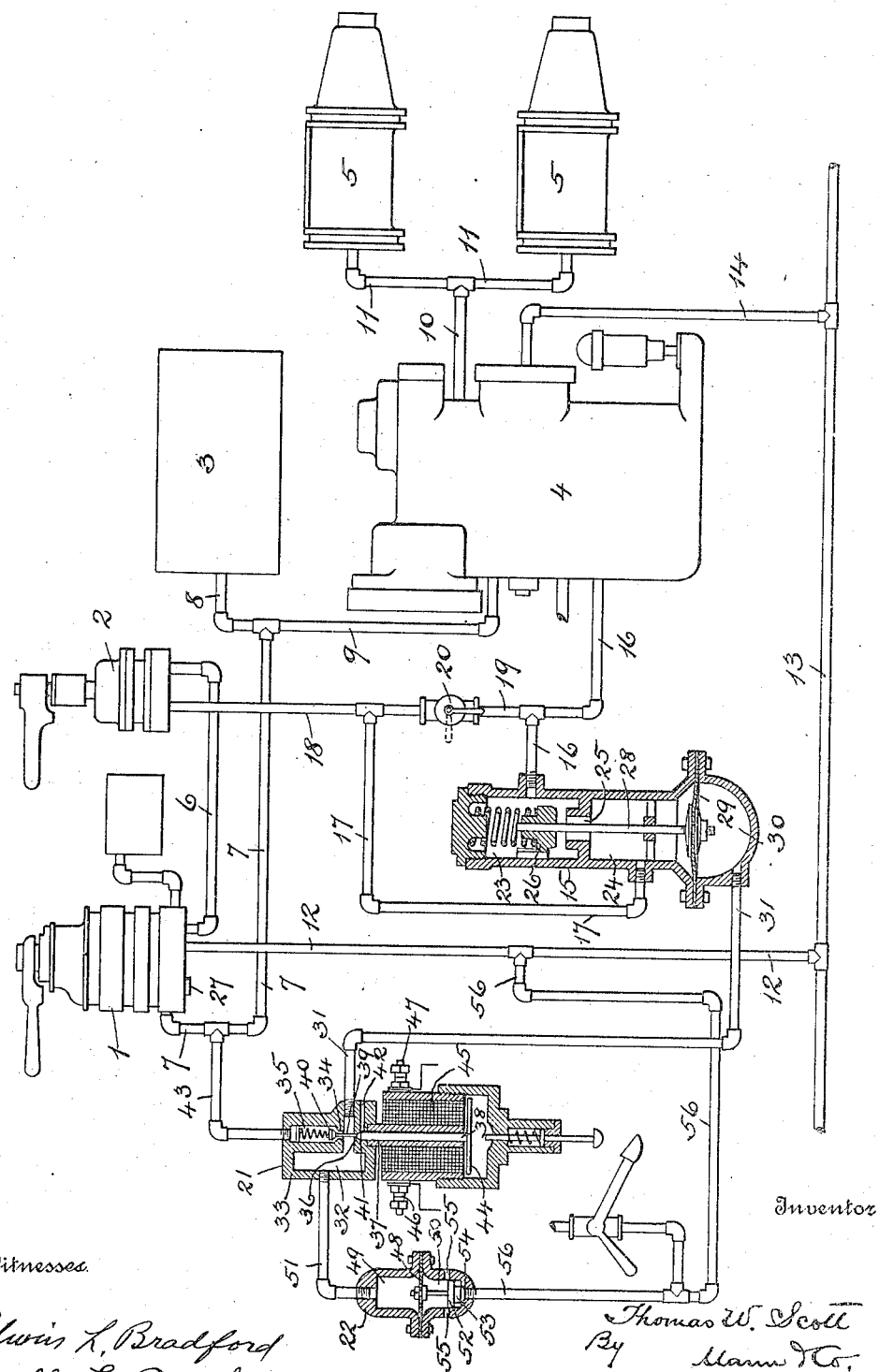
Witnesses.
Edwin L. Bradford
Izella E. Bagley
Inventor
Thomas W. Scott
By
Mann & Co.
Attorneys.

UNITED STATES PATENT OFFICE.

THOMAS W. SCOTT, OF BALTIMORE, MARYLAND, ASSIGNOR TO THE AMERICAN TRAIN CONTROL COMPANY, OF BALTIMORE, MARYLAND, A CORPORATION OF MARYLAND.

AIR-BRAKE-CONTROLLING MECHANISM.

1,240,796.  Specification of Letters Patent.  Patented Sept. 18, 1917.

Application filed November 23, 1916. Serial No. 133,055.

*To all whom it may concern:*

Be it known that I, THOMAS W. SCOTT, a citizen of the United States, residing at Baltimore city, in the State of Maryland, have invented certain new and useful Improvements in Air-Brake-Controlling Mechanism, of which the following is a specification.

This invention relates to improvements in air-brake controlling mechanism and is particularly designed for use in connection with automatic train-stop mechanisms.

In certain types of air-brake equipment, when the brakes are automatically applied by the venting of the train line, the engine brakes, as well as the train brakes are applied, but unless the engineer places his engineer's valve in, what is termed, the "lap" position, or the "holding" position, the engine brakes will leak off. It therefore requires an action on the part of the engineer to prevent the release of the engine brakes, that should not be necessary when the brakes are also to be controlled by an automatic stop device.

The present invention therefore has for its object to provide in the air-brake system referred to, means that will prevent the so-called, leak-off or release, of the engine brakes, after an automatic application of the brakes has been made independently of the engineer and by the operation of the train-stop mechanism.

The invention is illustrated in the accompanying drawing, which shows the engine equipment including the improved means employed in carrying out my invention.

In the drawing the numeral 1, designates the engineer's valve; 2, the independent brake valve which controls the engine brakes independently of the train brakes; 3, the main reservoir; 4, the distributing valve and 5, the brake-cylinders on the engine and tender. The so-called distributing valve controls the air to and from the brake-cylinders and performs such other functions as are usual in the operation of the air-brakes where the automatic stop and control are omitted. The engineer's valve 1, and the independent brake-valve 2, are connected by the usual pipe 6, while pipes 7, 8 and 9 provide connection between the engineer's valve, the main reservoir 3, and the distributing valve 4. A pipe 10, and its branches 11, provide connection between the distributing valve 4, and the brake-cylinders 5.

A pipe 12, connects the engineer's valve 1, with the train-line or brake-pipe 13, and another pipe 14, connects the distributing valve 4, with the said train-line or brake-pipe.

The devices above noted are all connected to operate in the usual and well-known manner of the Westinghouse No. 5 E T equipment.

In carrying out my invention however, I add to the ordinary equipment by interposing a brake-control valve mechanism 15, between the distributing valve 4, and the said independent brake valve 2, so that the application pipe 16, from the application chamber of the distributing valve 4, will connect with the brake-control valve and pipes 17 and 18, will connect the brake-control valve with the independent brake valve. It will thus be seen that instead of the distributing valve's application-pipe being directly connected to the independent brake valve as is ordinarily the case, the brake-control valve mechanism is now interposed in said connections. I however, provide a branch 19, with a cock 20, therein, which cock is normally closed, but may be opened in case it is desired to dispense with the control valve and its operations and effects.

I also add to the ordinary equipment, an automatic stop-valve magnet 21, and a vent valve device 22, through which the control-valve device is operated.

In the operation of the Westinghouse No. 5 E T equipment, the distributing valve 4, is interposed between the brake cylinders on the one side, and the main reservoir 3, and engineer's valves 1 and 2, on the other side, and the arrangement of the pistons and valves in the distributing valve is such that after the engineer's valve has been operated to effect an application of the brakes, the said engineer's valve must be moved to the "holding" or "lap" position otherwise the pressure will leak from the distributing valve 4, through the application pipe and vent to atmosphere at the engineer's valve, thus permitting the brakes to "leak off."

It will thus be seen that to prevent the leaking of the pressure and the release of the brakes, the engineer is required to do something at the engineer's valve, which he might neglect to do, or, which in case of sudden sickness, he is prevented from doing, and the result would be that even an automatic stop device would fail in the equipment referred to, unless some means be provided to prevent such release, even with the engineer's valve in the position that would otherwise permit such release.

By means of my improved control valve I avoid the possibility of a release of the brakes, by the leaking off of the pressure, when an automatic stop application has been made, and irrespective of the position of the engineer's valve.

By referring to the drawing it will be noted that the brake-control valve 15, has an upper chamber 23; a lower chamber 24; a port 25, and a valve 26, which controls said port.

The application pipe 16, from the distributing valve 4, through which pressure must pass to release the brakes, communicates with the upper chamber 23, and pipe 17, which may be considered as a continuation of the application pipe, leads from the lower chamber 24.

Inasmuch as cock 20, is closed, it is clear that release pressure through pipe 16, must pass through chamber 23; port 25, and chamber 24, to pipe 17, in order to finally vent at 27, from the engineer's valve.

Valve 26, in the control valve device is carried on a stem 28, which latter extends through port 25, and chamber 24, and said stem is connected to a flexible diaphragm 29, which extends across the upper side of a pressure chamber 30. This latter pressure chamber is always subject to main-reservoir pressure when the trackway conditions are safe, and as the reservoir pressure is always in excess of the pressure in the application pipe 16, and in the chambers 23 and 24, the greater pressure in chamber 30, acting on one side of the diaphragm 29, as against the lesser pressure in chamber 24, on the other side of the diaphragm, will bulge the diaphragm upward into chamber 24, and keep stem 28, and valve 26, elevated to leave port 25, open. Thus as long as the reservoir pressure can act on the one side of the diaphragm 29, the pipes 16 and 17, will be in communication through the control valve, and the brakes can be applied and released by the manipulations of the engineer's valves 1 or 2. When however, valve 26, is seated on port 25, by reason of a reduction, or no pressure, in the chamber 30, then the application pipe will be cut off from the engineer's valves, and the pressure from the interior of the distributing valve cannot escape to effect a release of the brakes, no matter in what position the engineer's valves may be placed. It will therefore be seen that the control valve device, when closed through the action of the automatic stop mechanism, renders the engineer's valves inoperative to release the brakes because the pressure cannot escape through port 25, from the distributing valve 4, and application pipe 16.

In the present illustration I have included an independent brake valve 2, as one of the elements, merely because such valve is a part of the equipment as used in practice, but it is to be understood that such independent brake valve is not essential to the present invention, because the operation of the apparatus is the same when pipes 18 and 6 are connected direct without having the connection made through the independent brake-valve structure.

It has herein before been pointed out that the control valve 15, is maintained in the open position to maintain communication between the application pipe from the distributing valve and the engineer's valve, as long as reservoir pressure is maintained in the chamber 30. The means employed to control the reservoir pressure and its action on the control valve is the automatic stop valve magnet device 21, which will now be briefly described.

A pipe 31, enters the chamber 30, of the control valve and said pipe extends to and communicates with a chamber 32, in a casing 33, of an electro-pneumatic valve structure, from which chamber there is a port 34, which communicates with a passage 35, also in said casing. Directly opposite the port 34, the casing has another port 36, which communicates with a passage 37, in which an armature stem 38, has movement or can reciprocate. This armature stem has a reduced end 39, which extends across the chamber 32, and passes through the ports 34 and 36, and at the upper side of port 34, said stem carries a valve head 40. This head 40, is so located that it may be drawn down to seat against and close port 34, under conditions that will presently be explained. At the lower side of port 36, the stem 38, carries a valve head 41, which normally seats against and closes port 36.

It will thus be seen that when port 34, is open, the port 36, will be closed.

A vent passage 42, extends laterally through the casing 33, from the passage 37, and its outer end opens to the atmosphere, so that when stem 38, is drawn down to close port 34, and open port 36, pressure in chamber 32, pipe 31, and chamber 30, of the control valve, will be vented through passage 42, to the atmosphere and thereby relieve the under side of diaphragm 29, of the reservoir pressure so that the pressure on the upper side of the diaphragm will move the latter downwardly together with stem 28, and valve 26, thereby seating valve 26, against port 25, and closing the latter.

Obviously, when valve 26, covers port 25, communication between the distributing valve 4, and its application pipe 16, will be cut off from the engineer's valve 1, or from the independent brake valve 2, if the latter is used, and of course "leak off" of pressure from said application pipe cannot take place because there is no vent for such pressure as long as valve 26, is closed.

A pipe 43, enters the passage 35, of the electro-pneumatic valve casing 33, and said pipe is always in communication with a pipe 7, that is continuously charged with pressure from the reservoir 3. It will thus be seen that when armature stem 38, is elevated, as it normally is, port 34, will be open, and chamber 32, will be charged with pressure equal to the pressure of the main reservoir, and as pipe 31, communicates at all times with chamber 32, it, and chamber 30, of the control valve will also be charged. When however armature stem 38, is lowered, port 34, will be closed against the supply of main reservoir pressure, and port 36, will be open to vent pressure from chamber 32, as well as from pipe 31, and chamber 30, so that valve 26, in the control valve device must remain seated over port 25, until the reservoir pressure is restored in the chamber 32, of the electro-pneumatic valve casing.

Armature-stem 38, is carried by an armature 44, of an electro-magnet 45, which latter is normally energized and holds the armature and stem up to close port 36, and keep port 34, open, so that as long as magnet 45, is energized, air from the main reservoir 3, may be retained in chamber 30.

The electro-magnet 45, has binding post connections 46, and 47, for the wires of the train control circuit by which, when the track ahead is clear, the magnet will be kept energized, but when a dangerous condition prevails the magnet will be deënergized.

The mechanism, and circuits employed along the trackway and the current supply and circuits on the engine to energize or deenergize the electro-magnet may be such as is disclosed in Patent, Number 1,049,306 granted December 31st, 1912 to Frank T. Jones and is so well-known to those familiar with the art that illustration in this case of that feature is deemed unnecessary.

The automatic stop mechanism through which the control valve is operated, also includes a vent-valve device 22, by means of which the train line of the air-brake equipment is vented, independently of the engineer's valve or the independent brake valve, so that the automatic stop may be effected entirely independent of any action on the part of the engineer.

In the present instance this vent valve device has the form of a two-part shell in which a diaphragm 48, is located so as to produce chambers 49 and 50 at opposite sides of the diaphragm.

Chamber 49, of this vent valve device is connected by a pipe 51, with the chamber 32, of the valve casing 33, so that whatever pressure said chamber 33, contains the same pressure will be present in chamber 49, on top of the diaphragm and thereby keep said diaphragm pressed down.

Chamber 50, of the vent valve device contains a piston 52, whose under side carries a valve 53, to normally seat over and close a port 54, and said piston and valve are connected to the diaphragm in such manner as to be held down by the action of the reservoir pressure on the upper side of the diaphragm. Above the piston 52, the wall of the vent valve device is provided with vent ports 55, so that when the piston is moved upwardly said ports will be thrown into communication with the space beneath the piston and permit the escape of air from said space.

A pipe 56, extends from port 54, and connects with the train line or with the pipe 12, that connects the engineer's valve and train line.

When, therefore, the electro-magnet 45, is deënergized because of unsafe conditions in the track ahead, the pressure in chamber 32, will be vented to the atmosphere which will also cause chamber 49, to be vented. Diaphragm 48, will then spring up and lift piston 52, and valve 53, thereby allowing air from the train line 13, to vent from pipe 12, to pipe 56; into the space under the raised piston 52, and pass out through vent ports 55, to the atmosphere. This venting of the train-line, following a deënergization of electro-magnet 45, will obviously effect an application of the brakes, just as though said train line had been vented by the engineer manipulating his engineer's valve.

From the foregoing explanation it will be understood that in order for the brakes on the engine to release, air must be vented, or must escape, from the distributing valve 4, through application pipe 16, to and through the engineer's valve, but this can only be done as long as valve 26, in the control valve structure is open. When the automatic application, however, takes place, that is, independently of the engineer's valve and by reason of the automatic stop mechanism, the valve 26, is closed because reservoir pressure has then been vented from chamber 30, consequently a release of the engine brakes cannot be effected, by "leak off" or by the engineer's valve until such pressure has been restored in chamber 30, by a resetting of the electro-penumatic valve, consequently the "leak off," of the brakes cannot now occur because of the interposition of my control valve in the application pipe.

Having described my invention, what I claim is,—

1. In an air-brake controlling device the combination with a main reservoir, of a brake cylinder; a train line; an engineer's valve; a distributing valve; connections for supplying air to the brake cylinders through the distributing valve; connections between the distributing valve and engineer's valve to control the release of the brakes through the engineer's valve; valve-means interposed in the connections between the distributing valve and engineer's valve to prevent release of the brakes through the engineer's valve and automatic means for controlling said valve-means.

2. In an air-brake controlling device the combination with a main reservoir, of a brake cylinder; a train line; an engineer's valve; a distributing valve having a connection with the brake cylinder and having an application pipe leading to the engineer's valve to control the release of the brakes through the engineer's valve; valve means interposed in said application pipe to cut off communication therethrough to the engineer's valve; means for holding said valve means in one position by reservoir pressure, and automatic means for venting said reservoir pressure from the holding means independently of the engineer's valve.

3. In an air-brake controlling device the combination with a main reservoir, of a brake cylinder; a train line; an engineer's valve; a distributing valve having a connection with the brake cylinder and having an application pipe leading to the engineer's valve to control the release of the brakes through the engineer's valve; valve means interposed in said application pipe to cut off communication therethrough to the engineer's valve; and electro-pneumatic means for automatically controlling said valve means.

4. In an air-brake controlling device the combination with a main reservoir, of a brake cylinder; a train line; an engineer's valve; a distributing valve having a connection with the brake cylinder and having an application pipe by which air may be vented through the engineer's valve to the atmosphere to release the brakes; valve means interposed in the application pipe between the distributing valve and the said engineer's valve; means for normally holding said valve means open by pressure from the main reservoir and means independent of the engineer's valve for venting the train line to apply the brakes and for venting the main reservoir pressure from the said valve means to close the latter and cut off communication between the engineer's valve and the distributing valve through said application pipe.

5. In an air-brake controlling device the combination with a main reservoir, of a brake cylinder; a train line; an engineer's valve; a distributing valve; connections between the distributing valve and brake cylinder; connections between the distributing valve and main reservoir; connections between the distributing valve and engineer's valve; normally open valve means in said latter connections; means for holding said valve means open and electric means for controlling said holding means.

6. In an air-brake controlling device the combination with a main reservoir, of a brake cylinder; a train line; an engineer's valve; a distributing valve; connections between the said distributing valve and main reservoir; connections between the distributing valve and brake cylinder; connections between the said distributing valve and the engineer's valve; valve means interposed in the connections between the distributing valve and the engineer's valve to control communications between the two; means for supplying main reservoir pressure to the said valve means to normally keep the latter open; a valve device to cut off the supply of the main reservoir pressure to the said valve means and effect a closing of the latter, and electric means for controlling the valve device.

7. In an air-brake controlling device the combination with a main reservoir, of a brake cylinder; a train line; an engineer's valve; a distributing valve; connections between the said distributing valve and main reservoir; connections between the distributing valve and brake cylinder; connections between the said distributing valve and the engineer's valve; valve means interposed in the connections between the distributing valve and the engineer's valve to control communication between the two; an automatic stop valve device having a connection to receive main reservoir pressure and another connection with the valve means whereby the main reservoir pressure may act on said valve means,—said automatic stop device also having electric means to effect a cutting off of the pressure and a venting of the same from the valve means, and a vent valve device having connection with the train line and also controlled by the action of the electric means whereby to effect an application of the brakes when the said valve means interrupts communication between the distributing valve and engineer's valve.

In testimony whereof I affix my signature in the presence of two witnesses.

THOMAS W. SCOTT.

Witnesses:
 CHAS. B. MANN,
 IZELLA E. BAGLEY.